United States Patent [19]

Whitley et al.

[11] 4,300,797
[45] Nov. 17, 1981

[54] COMPACTLY FOLDABLE RECREATION ENCLOSURE

[76] Inventors: William N. Whitley, 19315 Shaker Blvd.; James M. Whitley, 2963 Morley, both of Shaker Heights, Ohio 44122

[21] Appl. No.: 108,793

[22] Filed: Dec. 31, 1979

Related U.S. Application Data

[63] Continuation-in-part of Ser. No. 935,649, Aug. 21, 1978, Pat. No. 4,220,369, which is a continuation-in-part of Ser. No. 880,083, Feb. 22, 1978, Pat. No. 4,181,348.

[51] Int. Cl.³ .................................................. B60P 3/32
[52] U.S. Cl. ...................................... 296/164; 296/26; 296/165
[58] Field of Search ................. 296/164, 165, 156, 26, 296/27; 52/67

[56] References Cited

U.S. PATENT DOCUMENTS

| | | | |
|---|---|---|---|
| Re. 29,264 | 6/1977 | Woodward | 296/23 MC |
| D. 192,795 | 5/1962 | Sloat | D12/156 |
| D. 195,195 | 5/1963 | Hunter | D12/156 |
| D. 197,556 | 2/1964 | Coco | D12/156 |
| D. 198,497 | 6/1964 | Leichner | D12/156 |
| D. 214,036 | 5/1969 | Perry | D12/156 |
| D. 219,373 | 12/1970 | Serino | D12/156 |
| D. 230,261 | 2/1974 | Woodward | D12/156 |
| D. 238,942 | 2/1976 | Dixon | D12/156 |
| D. 247,711 | 4/1978 | Pittman | D12/156 |
| 1,850,638 | 3/1932 | Schidler | 296/23 R |
| 1,984,681 | 12/1934 | Jackson | 296/23 R |
| 2,359,577 | 10/1944 | Patrick | 296/23 R |
| 2,493,368 | 1/1950 | Smelker | 296/23 MC |
| 2,531,678 | 11/1950 | Gladhill | 296/23 MC |
| 2,561,168 | 7/1951 | Beckley | 296/23 R |
| 2,567,104 | 9/1951 | Fonzo | 296/23 R |
| 2,614,882 | 10/1952 | Cook | 296/23 MC |
| 2,625,165 | 1/1953 | Eskew | 296/23 R |
| 2,645,518 | 7/1953 | Cook | 296/23 MC |
| 2,718,015 | 9/1955 | Fisk | 296/23 R |
| 2,800,264 | 7/1957 | McFadyen | 296/23 MC |
| 2,907,077 | 10/1959 | Pugsley | 296/23 MC |
| 2,917,059 | 12/1959 | Emanuelson | 296/23 R |
| 2,930,051 | 3/1960 | Kampmeier | 296/23 R |
| 2,942,609 | 6/1960 | Ferguson | 296/23 R |
| 3,003,808 | 10/1961 | Swanberg | 296/23 MC |
| 3,097,013 | 7/1963 | Mussler | 296/23 R |
| 3,111,955 | 11/1963 | Green | 296/23 R |
| 3,143,121 | 8/1964 | McKee | 296/23 MC |
| 3,160,434 | 12/1964 | Hedgepeth | 296/23 R |
| 3,185,518 | 5/1965 | Zentner | 296/23 MC |
| 3,191,829 | 6/1965 | Davis | 296/23 MC |
| 3,230,084 | 12/1966 | McPherson | 296/23 MC |
| 3,257,019 | 6/1966 | Carroll | 296/23 MC |
| 3,259,422 | 7/1966 | Canon | 296/23 MC |
| 3,283,452 | 11/1966 | Hayes | 296/23 R |
| 3,288,517 | 11/1966 | Bender | 296/23 MC |
| 3,288,519 | 11/1966 | McFarland | 296/23 MC |
| 3,321,876 | 5/1967 | Birkenheuer | 296/23 MC |
| 3,326,594 | 6/1967 | Van Atta | 296/23 MC |
| 3,400,968 | 9/1968 | Smith | 296/23 MC |
| 3,410,598 | 11/1968 | Davis | 296/23 MC |
| 3,411,819 | 11/1968 | Tyree | 296/23 MC |
| 3,451,712 | 6/1969 | Power | 296/23 MC |
| 3,575,460 | 4/1971 | Kennedy | 296/23 R |
| 3,623,762 | 11/1971 | Fagan | 296/23 R |
| 3,628,825 | 12/1971 | Hanboosh | 296/23 R |
| 3,635,515 | 1/1972 | White | 296/23 MC |
| 3,652,121 | 3/1972 | Hjelm | 296/26 |
| 3,661,481 | 5/1972 | Stewart | 296/23 MC |
| 3,695,676 | 10/1972 | Clark | 296/23 MC |
| 3,733,102 | 5/1973 | Serino | 296/23 MC |
| 3,746,386 | 7/1973 | Woodward | 296/23 MC |
| 3,762,759 | 10/1973 | Hall | 296/23 MC |
| 3,774,957 | 11/1973 | Basaraba | 296/23 MC |
| 3,863,977 | 2/1975 | Hardinge | 296/23 MC |

*Primary Examiner*—Joseph F. Peters, Jr.
*Assistant Examiner*—John A. Carroll
*Attorney, Agent, or Firm*—Burge & Porter Co.

[57] ABSTRACT

A lightweight, compactly foldable recreation enclosure particularly useful as a camper capsule for automobiles is releasably mountable about trunk portions of an automobile without requiring the formation of holes in the automobile body, whereby the watertight integrity of the automobile trunk compartment is maintained. The enclosure has side, front, top and back wall portions which are foldable to compactly overlie the trunk compartment of an automobile, thereby enabling a relatively large camper capsule having a capability of sleeping three adults to be collapsed to a substantially reduced size for over-the-road travel. In one embodiment, the foldable side, front, top and back wall portions are formed from rigid materials and are pivotally mounted for folding. In another embodiment, the foldable side wall portions are formed from flexible material such as canvas.

43 Claims, 6 Drawing Figures

COMPACTLY FOLDABLE RECREATION ENCLOSURE

The present application is a continuation-in-part of patent application Ser. No. 935,649, filed Aug. 21, 1978, and now U.S. Pat. No. 4,220,369, which is a continuation-in-part of patent application Ser. No. 880,083, filed on Feb. 22, 1978, and now U.S. Pat. No. 4,181,348. This application is also related to Design patent application Ser. No. 880,319, filed Feb. 22, 1978, and now U.S. Pat. No. D256,685.

BACKGROUND OF THE INVENTION

1. Field of the Invention

The present invention relates generally to a recreation enclosure and, more particularly, to a novel and improved, lightweight, compactly foldable enclosure especially useful as a camper capsule which can be removably mounted about trunk portions of an automobile.

2. Prior Art

While proposals have been made for various types of shelters adapted for attachment to portions of automobiles, most such proposals have suffered one or more of the following drawbacks:

(A) the proposed structures have been relatively massive, both in size and weight, and, in many instances, have required specialized equipment to effect their mounting on and removal from an automobile;

(B) where the proposed structures have been of sufficiently large size to accommodate a plurality of persons, the weight of these units has undesirably affected the driving characteristics of the automobile, and, in some instances, has required the installation of special suspension system equipment and/or the use of additional wheels to support the structures;

(C) where proposed shelter structures have been designed for mounting over the trunk of a vehicle, they have either required removal of the trunk lid in order to permit the use of the trunk space or have been mounted at distances sufficiently removed from the trunk lid to permit its opening, or have prohibited access to the trunk; and, (D) many proposals for automobile-mounted shelters have required the installation of fasteners through the body of the car and have thereby destroyed the watertight integrity of the trunk and/or passenger compartment.

In some instances, proposed shelters adapted for trunk mounting have, themselves, occupied the vast majority of the trunk space and have thereby prohibited the normal use of the trunk compartment.

Still another problem encountered with many proposals for automobile-mounted shelters is that the shelters are difficult to store in a garage stall in such a manner as will permit normal use of the stall by an automobile. Where proposed shelters have been storable in a garage stall without inhibiting normal use of the stall by an automobile, most have required relatively elaborate stands or guy-wire systems to support the shelters above the garage floor or in a suspended attitude from the garage ceiling.

While many proposals have been made for automobile-mounted shelters of various types, prior to the conception of the invention described in the referenced Grandparent Utility Patent, the need had gone unanswered for a relatively simple and inexpensive, easy to install, easy to store, lightweight camper capsule which would not prohibit effective use of the trunk space of an automobile.

3. The Parent and Grandparent Patents

The referenced Parent and Grandparent Utility Patents address the foregoing and other drawbacks of the prior art by providing novel and improved, trunk-mountable camper capsules for automobiles which are light in weight, which will accommodate a plurality of persons, which can be installed on an automobile, removed and stored with ease, and which do not prevent normal storage use of an automobile trunk compartment. The referenced Grandparent Design Patent relates to an attractive design configuration for such a camper capsule. Moreover, such camper capsules as may embody the subjects matter of one or both of the Parent and Grandparent Utility Patents are adapted for use with a wide variety of automobile model configurations without requiring the insertion of fasteners through holes formed in the automobile body, whereby the watertight integrities of the automobile trunk and passenger compartments are preserved.

In accordance with the preferred practice of the invention described in the Grandparent Utility Patent, a trunk-mountable camper capsule includes a compartment-defining means and a mounting system for mounting the compartment-defining means about trunk portions of an automobile. The compartment-defining means includes an upstanding frame structure having spaced side walls with top and bottom walls extending transversely between and interconnecting the side walls to define four walls of a "primary" compartment adapted to be positioned rearwardly of the trunk compartment of an automobile. The compartment-defining means also includes a forwardly-extending structure having spaced side walls with top and bottom walls extending transversely therebetween and interconnecting the side walls to define four walls of a "secondary" compartment adapted to overlie the trunk compartment of an automobile. The upstanding frame structure includes a forwardly-facing wall which interconnects the two bottom walls, and a rear wall interconnecting the frame's side, top and bottom walls. The forwardly-extending structure includes a front wall interconnecting the structure's side, top and bottom walls. The side walls and top walls of the frame and forwardly-extending structures are rigidly interconnected to communicate the primary and secondary compartments, whereby a single, large habitable enclosure is defined by the capsule.

While the camper capsule described in the Grandparent Utility Patent overcomes many drawbacks of prior art proposals, it is of rigid construction and does not have movable wall portions which will permit the capsule to be folded to provide a more compact configuration for over-the-road travel. The Parent Utility Patent is an improvement in the construction of a camper capsule of the type described in the referenced Grandparent Utility Patent, which improvement permits the resulting camper capsule to be folded to a more compact configuration for over-the-road travel without necessarily altering the unfolded appearance of the capsule from that shown in the referenced Grandparent Design Patent. The camper capsule described in the referenced Parent Utility Patent includes a rigid bottom structure with a foldable upper structure. The foldable upper portion includes wall portions which define essentially the upper half of the camper. In one embodiment, the foldable wall portions are formed from rigid materials and are hingedly interconnected and arranged to be folded to a collapsed position overlying the trunk of an automobile on which the camper is mounted. In another embodiment, certain of the foldable walls are formed from flexible material such as canvas supported on frames, and the foldable walls are positionable in a collapsed position overlying the trunk of an automobile on which the camper is mounted.

While the camper capsule described in the Parent Utility Patent is an improvement over many prior art proposals, is still contains non-foldable portions contributing somewhat to the bulk of the folded camper capsule.

SUMMARY OF THE INVENTION

The present invention relates to an improvement in the construction of a recreation enclosure, particularly a camper capsule of the type described in the referenced Parent Utility Patent, which improvement permits the resulting enclosure to be folded to an extremely compact configuration.

In accordance with the preferred practice of the present invention, a recreation enclosure in the form of a trunk-mountable camper capsule of the general character described in the referenced Parent and Grandparent Utility Patents includes a rigid bottom structure with a foldable upper structure. The rigid bottom structure includes wall portions defining essentially the bottom half of the camper described in the referenced Parent and Grandparent Utility Patents. The foldable upper portion includes wall portions which define essentially the upper half of the camper. In one embodiment, the foldable wall portions are formed from rigid materials and are hingedly interconnected and arranged to be folded to a substantially thin, collapsed position. In another embodiment, certain of the foldable walls are formed from flexible material such as canvas and the foldable walls are positionable in a substantially flat, thin, collapsed position.

In the first embodiment, a majority of the relatively rigid wall portions are preferably formed from plastics material such as glass fiber fabric embedded in resin. In this embodiment, upper side wall portions are hingedly interconnected with lower side wall portions and are foldable inwardly. With this embodiment, front, top and back wall portions are also hingedly interconnected and are foldable inwardly. In the second embodiment, upper and lower side wall portions are formed from flexible material such as canvas.

As will be apparent from the foregoing summary, it is an object of the present invention to provide a novel and improved, compactly foldable recreation enclosure.

It is yet another object of the present invention to provide an improved, compactly foldable, trunk-mountable camper for automobiles.

It is a further object of the present invention to provide a novel and improved, compactly foldable, trunk-mountable camper capsule which is light in weight and which is adapted for use with a wide variety of automobile model configurations without preventing normal use of their trunk compartments.

It is a further object of the present invention to provide a novel and improved, compactly foldable, trunk-mountable camper capsule which will accommodate three adults.

These and other objects and a fuller understanding of the invention described in the present application may be had by referring to the detailed description and the claims in conjunction with the accompanying drawings.

DESCRIPTION OF THE PREFERRED EMBODIMENT

In accordance with the preferred practice of the present invention, a recreation enclosure in the form of a trunk-mountable camper capsule of the general character described in the referenced Parent and Grandparent Utility Patents includes a rigid bottom structure with a foldable upper structure. The rigid bottom structure includes wall portions defining essentially the bottom half of the camper described in the referenced Parent and Grandparent Patents. The foldable upper portion includes wall portions which define essentially the upper half of this camper. In the preferred embodiment, a camper capsule 20 has lower and upper portions 22, 24. The foldable upper portion 24 includes hingedly interconnected wall portions formed from rigid materials and arranged to be folded to a collapsed position overlying the trunk of an automobile on which the camper is mounted.

Figure 1:
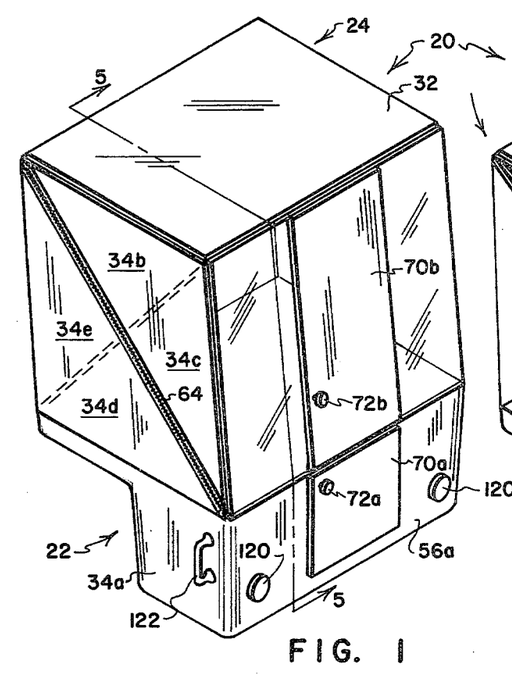
FIG. 1 is a perspective view of a recreation enclosure according to the invention, the enclosure being in the form of a camper capsule, the capsule being shown with its foldable side, front, top and back wall portions in their extended, operational position.
Figure 2:
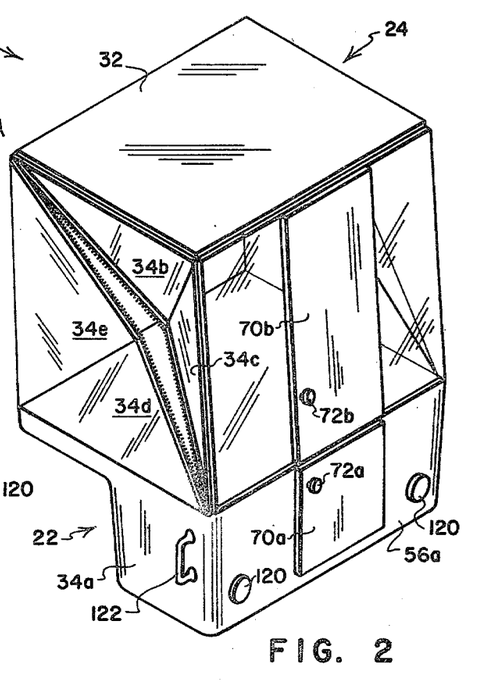
FIG. 2 is a perspective view similar to FIG. 1 with side wall portions of the camper capsule partially folded inwardly toward their collapsed position, and with other portions of the camper capsule moved appropriately to permit the side wall portions to be inwardly folded.
Figure 5:
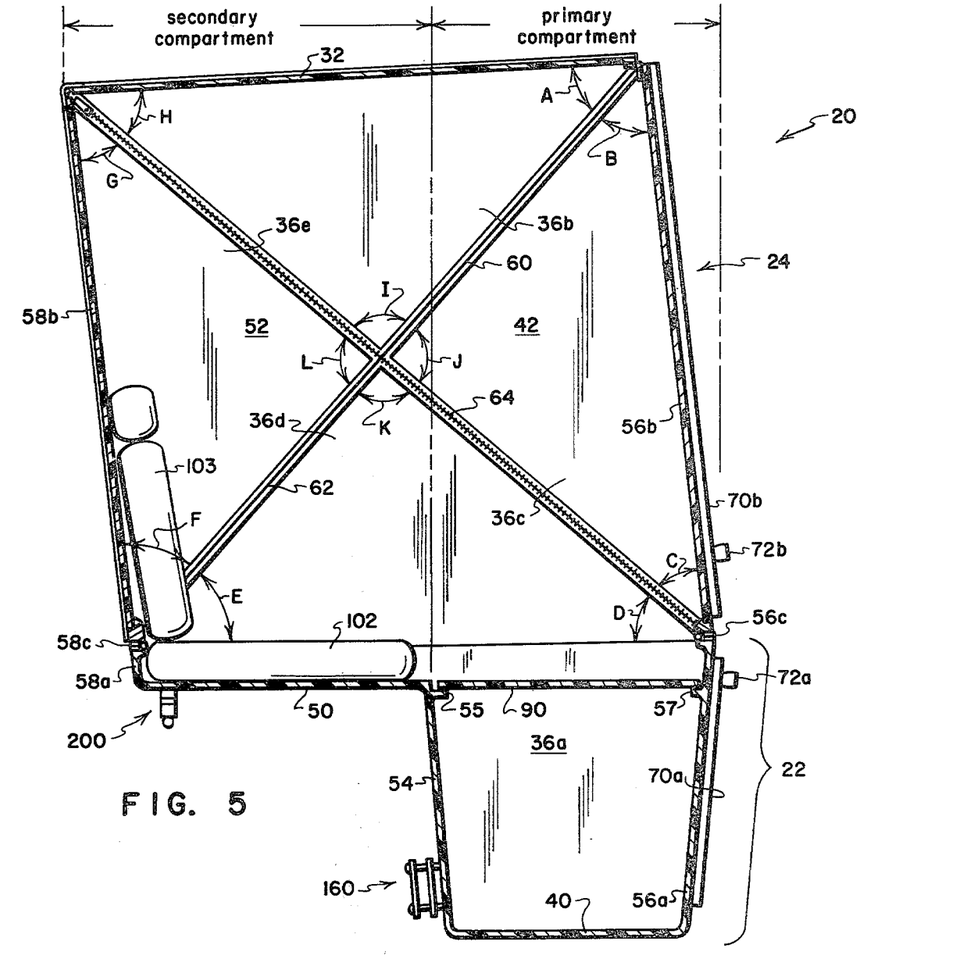
FIG. 5 is an enlarged sectional view as seen from a plane indicated by a broken line 5—5 in FIG. 1.

Referring to FIGS. 1 and 5, the camper capsule 20 is shown in its extended or operating position wherein its exterior walls define a habitable enclosure. The enclosure may be thought of as comprising two interconnected regions which will be referred to as "primary" and "secondary" compartments, indicated in FIG. 5 by the numerals 42, 52. The primary compartment 42 is a region which is taller than the secondary compartment 52 and which is positioned rearwardly of the trunk compartment of an automobile when the camper capsule 20 is mounted on an automobile. The secondary compartment 52 forms a forwardly-extending extension of upper portions of the primary compartment, and overlies the trunk lid of an automobile when the camper capsule 20 is mounted on an automobile. The bottom structure 22 defines lower portions of both the primary and secondary compartments 42, 52. The foldable upper structure 24 defines upper portions of the primary and secondary compartments 42, 52.

As is explained in detail in the referenced Grandparent Utility Patent, the camper capsule 20 is provided with a unique mounting system for supporting it about trunk portions of an automobile. Inasmuch as the mounting system is described in detail in the referenced Grandparent Utility Patent, it need not be described in detail here. The mounting system includes a bumper mounting assembly indicated in FIG. 5 by the numeral 160, and a body mounting assembly indicated by the numeral 200. The mounting assemblies 160, 200 require the formation of no holes in body portions of an automobile, whereby the watertight integrity of its trunk compartment is maintained. The bumper mounting assembly 160 is operable to pivotally mount the camper capsule 20 for movement to a position out of the path of movement of the trunk lid of an automobile, whereby ready access may be had to the trunk compartment of the automobile on which the camper capsule 20 is mounted.

The bottom structure 22 includes a bottom wall 40 which defines the floor of the primary compartment, and a bottom wall 50 which defines the floor of the secondary compartment 52. A forwardly facing wall 54 interconnects the bottom walls 40, 50. Lower side wall portions 34a, 36a close opposite side regions of lower portions of compartments 42, 52. A lower rear wall portion 56a closes the lower portion of the primary compartment 42, while a lower front wall portion 58a closes the lower portion of the secondary compartment 52.

The foldable upper structure 24 includes a forwardly-extending top wall portion 32. An upper front wall portion 58b extends from the lower front wall portion 58a into engagement with the forward end of the top wall portion 32. An upper rear wall portion 56b extends from the lower rear wall portion 56a upwardly into engagement with the rearward edge of the top wall portion 32. The upper front and rear wall portions 58b, 56b are connected to the lower front and rear wall portions 58a, 56a, respectively, by hinges 58c, 56c. In preferred practice, the top wall portion 32, the upper rear wall portion 56b, and the upper front wall portion 58b are hingedly interconnected and form part of the upper structure 24. The upper structure 24 is movable, as will be explained, to a position wherein it overlies and covers the open upwardly facing top of the bottom structure 22. The rear wall portion 56b may be formed from transparent or semi-transparent material to provide windows for the camper capsule 20.

The remaining open side regions of the primary and secondary compartments 42, 52 are closed by left side wall portions 34b, 34c 34d, 34e and by substantially identical right side wall portions 36b, 36c, 36d, 36e. The side wall portions are formed from opaque, rigid materials such as glass fiber fabric embedded in resin. As is best seen in FIG. 5, the upper structure 24, in cross section, defines a quadrilateral. The quadrilateral is bounded by the top wall portion 32, the upper front wall portion 58b, the upper rear wall portion 56b, and a plane connecting the hinges 56c, 58c. In preferred form, the front wall 58b and the top wall 32 are the same length, while the distance separating the hinges 56c, 58c and the rear wall 56b is the same length. The front wall 58b is shorter than the rear wall 56b and, thus, the upper structure 24, in cross section, defines a trapezium. Because the walls 32, 56b, 58b are approximately the same length, the upper structure 24 also approximates a parallelogram. The right side wall portions 36b, 36c, 36d, 36e, each are triangular and cooperate to completely fill the trapezium. The side wall portions 34b, 34c and 36b, 36c are joined along adjacent edge portions by a flexible connection 60. The side wall portions 34d, 34e and 36d, 36e are joined along adjacent edge portions by a flexible connection 62. The flexible connections 60, 62 form a line extending from one corner of the trapezium near the hinge 58a to the diametrically opposite corner of the trapezium. Zippers 64 join adjacent edge portions of the wall portions 34c, 34d and 34b, 34e as well as side wall portions 36c, 36d and 36b, 36e. The zippers 64 extend in a straight line from one corner of the trapezium near the hinge 56c to the diametrically opposite corner of the trapezium.

Angles A, B, C, D, E, F, G, H, I, J, K and L indicate the various geometric relationships among the side wall portions 36b, 36c, 36d, 36e. More specifically, angles I, J, K, L are right angles, or substantially so, and the length of the top wall portion 32 and the upper front and rear wall portions 58b, 56b are such that the panels 36b, 36c, 36d, 36e approximately define right-angled scalene triangles. Because the upper front and rear wall portions 58b, 56b are almost parallel with each other in the extended position, because the top wall portion 32 and the plane connecting the hinges 58c, 56c are almost parallel with each other, and because the panels 36b, 36c, 36d, 36e are connected to each other with straight edge portions, angle A approximately equals angle E, angle B approximately equals angle F, angle C approximately equals angle G, and angle D approximately angle H. In order for the upper structure 24 to fold compactly without buckling any of the components, angle A must equal angle B and angle E must equal angle F. Other geometric relationships among the various components of the upper structure 24 will be evident. From a functional point of view, upon extending the upper structure 24 to that position shown in FIGS. 1 and 5, and upon closing the zippers 64, the upper structure 24 will be exceedingly rigid and cannot be collapsed without undoing the zippers 64.

Figures 3, 4:
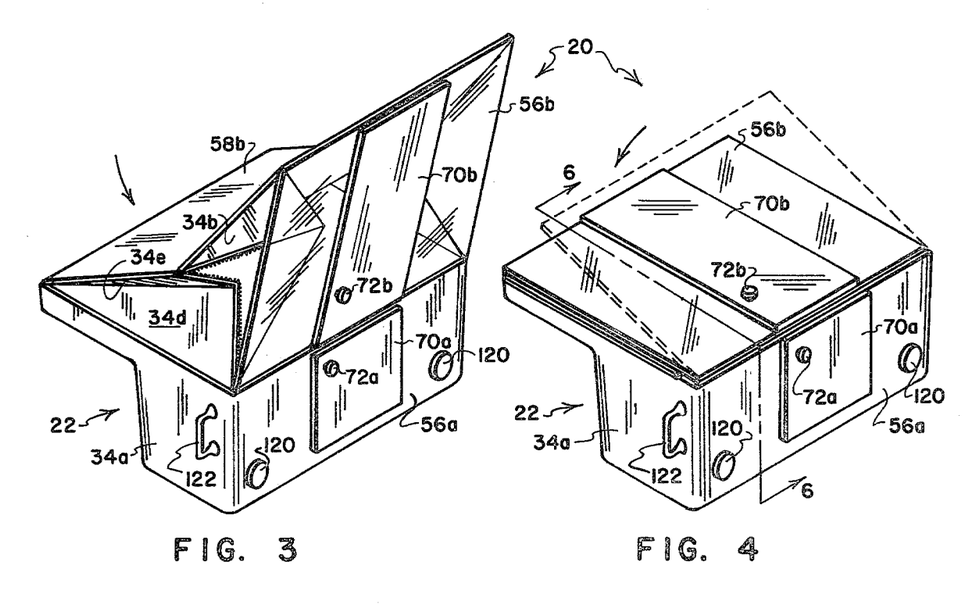
FIG. 3 is a view similar to FIG. 1 with side wall portions folded inwardly and showing front, top and back wall portions during the process of their being folded or moved to a collapsed position for over-the-road travel.
FIG. 4 is a view similar to FIG. 3 with the front, top and back wall portions in their collapsed position.
Figure 6:
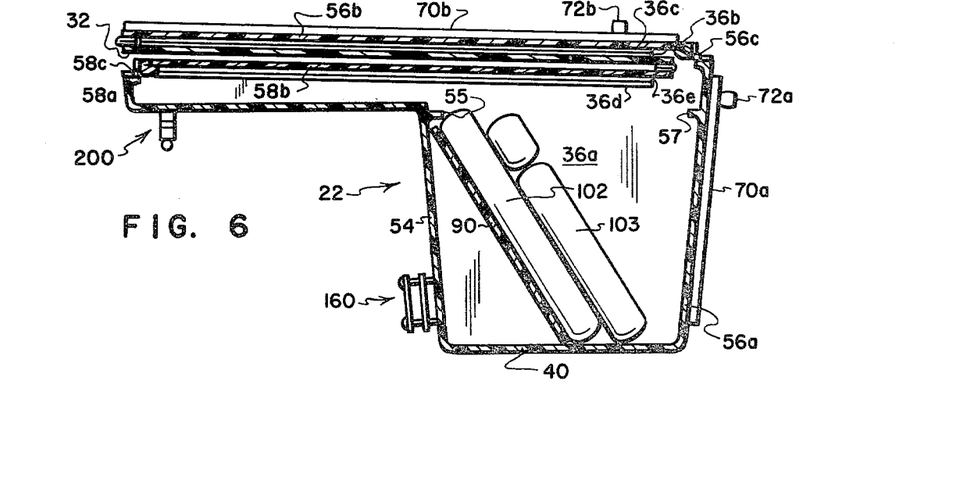
FIG. 6 is a sectional view similar to FIG. 5, as seen from a plane indicated by a line 6—6 in FIG. 4.

In order to collapse the upper structure 24 to a compact, folded position, and particularly referring to FIGS. 2, 3, 4 and 6, upon undoing the zippers 64, the upper front and rear wall portions 58b, 56b, are pushed rearwardly to a parallel, vertical position. In this position, the left side wall portions 34b, 34c, 34d, 34e and the right side wall portions 36b, 36c, 36d, 36e are simultaneously folded inwardly toward each other. Thereafter, the upper front wall portion 58b is pivoted further rearwardly toward a collapsed position, while the upper rear wall portion 56b assumes an extreme rearwardly pivoted position (FIG. 3). The upper rear wall portion 56b then is pivoted forwardly to a position where it, along with the other folding components of the upper structure 24, overlies and closes bottom regions of the compartments 42, 52 in a rigid watertight cover as is best seen in FIGS. 4 and 6. Suitable releasable fasteners, not shown, are provided to retain the upper structure 24 in its folded or collapsed position for over-the-road travel.

Referring to FIG. 6, the folded positions of the various portions of the upper structure 24 are illustrated in greater detail. In the completely folded position, the upper rear wall portion 56b overlies the side wall portions 34c, 34b, 36c, 36b; the side wall portions 34c, 34b, 36c, 36b overlie the top wall portion 32. The top wall portion 32 overlies the front wall portion 58b, and the upper front wall portion 58b overlies the side wall portions 34e, 34d, 36e, 36d. The height of the side wall portions is such that none of the portions 34b, 34c, 34d, 34e overlaps the portions 36b, 36c, 36d, 36e in the collapsed position. That is, the height of any given side wall portion is less than half the width of the wall portions 32, 56b, 58b. Accordingly, the various wall portions cooperate in the folded position to produce an exceedingly compact upper structure 24 having an essentially completely flat upper surface.

In order for the several wall portions which form the foldable upper structure 24 to pivot and move in the manner described, suitable hinges are provided. Hinges 56c, 58c have been described already. Other suitably configured hinges are shown in the Parent and Grandparent Utility Patents and it will be appreciated that any of various hinge structures, including fabric or tape hinge structures, can be used to connect the components which form the upper structure 24.

Referring to FIG. 1, lower and upper doors 70a, 70b are provided for the lower and upper rear wall portions 56a, 56b. The doors 70a, 70b are pivotally mounted on the rear wall portions 56a, 56b and cooperate to define a substantially rectangular passage for entry into, and exit from, the interior of the camper capsule 20. Conventional lockable door latches 72a, 72b are provided for retaining the doors 70a, 70b in their closed position.

Referring to FIG. 5, the bottom wall 50 provides a sleeping platform which may be extended by a cot 90. The cot 90 is preferably formed from relatively rigid material and may be stored for over-the-road travel in the lower region of the primary compartment 42, as illustrated in FIG. 6. The cot 90 may be formed in a plurality of segments arranged side-by-side with each of the segments having front and rear portions supported on inwardly projecting lips 55, 57 formed on the walls 54, 56a. By utilizing a series of segments, a portion of the primary compartment 42 can be kept for standing room while other portions can be devoted to seating areas.

Cushions, indicated generally by numerals 102 and 103, are provided for positioning atop the bottom wall 50, as shown in FIG. 5. During transit, the cushions 102, 103 are preferably stored in the lower portion of the primary compartment 42, as illustrated in FIG. 6.

When the cot 90 is in its sleeping position, as shown in FIG. 5, and when the cushions 102, 103 are positioned to overlie the bottom wall 50 and the cot 90, a comfortable bed is provided which is capable of sleeping two adults side-by-side. Additionally, the primary compartment portion located beneath the cot 90, when the cot is in its sleeping position, can sleep a third adult.

Suitable taillights 120 and handle formations 122, and such other conventional hardware as may be desired to enhance the longevity and safety of operation of the camper capsule 20, may be provided on exterior wall portions of the camper capsule. Other optional accessories such as are described in the referenced Parent and Grandparent Utility Patents may also be provided on the camper capsule 20.

Instead of utilizing rigid side wall members 34b, 34c, 34d, 34e, 36b, 36c, 36d, 36e, the camper capsule 20 may be provided with flexible side wall members, if desired. All that is required is a substitution of a material such as canvas for the rigid side wall panel material shown in FIGS. 1-6. Even though the individual side walls may be flexible, the upper structure 24 will be locked into a rigid assembly upon fastening the zippers 64.

As will be apparent from the foregoing description, the present invention provides a simple and relatively inexpensive, foldable enclosure which can be collapsed easily to a very thin, compact configuration. In the form of a camper capsule, it can be mounted with ease on automobiles of a wide variety of configurations to serve the travel and sleeping needs of three adults. It also will be apparent that the principles of the present invention can be used to create other structures such as tents, beach houses, portable outhouses, and so forth. In short, the present invention can be applied to a variety of different structures, any of which can be collapsed quickly into a compact, easily transportable assembly.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exist in the invention disclosed.

We claim:

1. A recreation enclosure capable of being collapsed quickly from an assembled configuration to a substantially flat, thin, compact configuration for travel or storage, comprising:
   (a) a first wall supported for pivotal movement along a lower edge by a first pivotal support;
   (b) a second wall supported for pivotal movement along a lower edge by a second pivotal support, the second wall in the assembled configuration lying in a plane generally parallel to the plane in which the first wall lies;
   (c) the first and second pivotal supports defining substantially parallel lines spaced from each other;
   (d) a top wall hingedly connected at opposed edges to upper edges of the first and second walls, the top wall in the assembled configuration lying in a plane generally parallel to a plane in which the first and second pivotal supports lies; and
   (e) multi-paneled side walls positioned at or near lateral edges of the first, second, and top walls to define an enclosure, the side walls being hingedly connected to the first, second and top walls, the individual panels of the side walls being movable with respect to each other and to the first, second and top walls, the movement of the panels permitting the first, second, and top walls to be folded inwardly and stacked compactly.

2. The enclosure of claim 1, wherein each panel of each side wall is in the form of an approximate right-angled triangle, with the hypotenuse of the triangles being hingedly connected to the first, second and top walls, and the approximate right-angled corners of the triangles being adjacent each other when the enclosure is in the assembled configuration, the triangles being hingedly connected to each other along a line extending from the second pivotal support to the diametrically opposite upper edge of the first wall, and releasably connected to each other along a line extending from the first pivotal support to the diametrically opposite upper edge of the second wall.

3. The enclosure of claim 1, wherein the first, second, top and side walls are formed of relatively rigid material.

4. The enclosure of claim 1, wherein the first, second and top walls are formed of relatively rigid material, and the side walls are formed of a flexible material.

5. The enclosure of claim 1, wherein the planes in which the first and second pivotal supports and the top wall lie are inclined at an angle to the horizontal in the assembled configuration.

6. The enclosure of claim 5, wherein the planes in which the first and second walls lie are inclined at an angle from the vertical in the assembled configuration.

7. The enclosure of claim 2, wherein the releasable connection between adjacent side wall panels is in the form of a zipper.

8. A recreation enclosure having first, second, top and side wall portions which are interconnected for folding movement between a substantially flat, thin, collapsed position and an extended operational position, comprising:
 (a) rectangular first, second, and top wall portions which, when viewed from the side, define a quadrilateral;
 (b) the side wall portions including a plurality of panels, the panels being hingedly connected to each other and to the first, second, and top wall portions; and,
 (c) a releasable, diagonal connection between adjacent panels, the connection extending from one corner of the quadrilateral to a diametrically opposite corner of the quadrilateral, the releasable connection, when released, permitting the panels to fold inwardly and the first, second, and top wall portions to be folded with respect to each other into a substantially flat, collapsed position.

9. The enclosure of claim 8, wherein the first, second, top, and side wall portions are formed of relatively rigid material.

10. The enclosure of claim 8, wherein the first, second, and top wall portions are formed of relatively rigid material, and the side wall portions are formed of flexible material.

11. The enclosure of claim 8, wherein the releasable connection is in the form of a zipper.

12. The enclosure of claim 8, wherein the quadrilateral is a trapezium.

13. The enclosure of claim 12, wherein the first and top walls are of equal length, and the second wall is longer than the first wall.

14. The enclosure of claim 13, wherein one end of the releasable connection is located at the intersection between the first and top walls.

15. The enclosure of claim 8, wherein the panels are in the form of approximate right-angled triangles.

16. A trunk-mountable camper capsule for automobiles, comprising:
 (a) structure defining an enclosure having a primary compartment portion adapted to extend rearwardly of the trunk compartment of an automobile, and a secondary compartment portion in communication with the primary compartment portion and adapted to overlie the trunk compartment;
 (b) lower portions of the structure which overlie and extend along the trunk compartment of an automobile being formed from relatively rigid material and providing an upwardly opening space forming lower regions of both the primary and secondary compartment portions; and,
 (c) upper portions of the primary and secondary compartment portions including;
 (i) a first wall supported for pivotal movement along a lower edge by a first pivotal support;
 (ii) a second wall supported for pivotal movement along a lower edge by a second pivotal support, the second wall in an extended, operational position lying in a plane generally parallel to the plane in which the first wall lies;
 (iii) the first and second pivotal supports defining substantially parallel lines spaced from each other and lying in a common plane;
 (iv) a top wall hingedly connected at opposed edges to upper edges of the first and second walls, the top wall lying in a plane generally parallel to the plane in which the first and second pivotal supports lies; and
 (v) multi-paneled side walls positioned at or near lateral edges of the first, second and top walls to define an enclosure, the side walls being hingedly connected to the first, second and top walls, the individual panels of the side walls being movable with respect to each other and to the first, second and top walls, the movement of the panels permitting the first, second and top walls to be folded inwardly and stacked compactly.

17. The trunk-mountable camper of claim 16, wherein each panel of each side wall is in the form of an approximate right-angled triangle, with the hypotenuse of the triangles being hingedly connected to the first, second and top walls, and the approximate right-angled corners of the triangles being adjacent each other when the camper is in the operational position, the triangles being hingedly connected to each other along a line extending from the second pivotal support to the diametrically opposite upper edge of the first wall, and releasably connected to each other along a line extending from the first pivotal support to the diametrically opposite upper edge of the second wall.

18. The trunk-mountable camper of claim 17, wherein the releasable connection is in the form of a zipper.

19. The trunk-mountable camper of claim 16, wherein the first, second, top and side walls are formed of relatively rigid material.

20. The trunk-mountable camper of claim 16, wherein the first, second and top walls are formed of relatively rigid material, and the side walls are formed of a flexible material.

21. A trunk-mountable camper capsule for automobiles, comprising:
 (a) structure defining an enclosure having a primary compartment portion adapted to extend rearwardly of the trunk compartment of an automobile, and a secondary compartment portion in communication with the primary compartment portion and adapted to overlie the trunk compartment;
 (b) lower portions of the structure which overlie and extend along the trunk compartment of the automobile being formed from relatively rigid material and providing an upwardly opening base forming lower regions of both the primary and secondary compartment portions; and
 (c) upper portions of the structure including front, top, rear, and side wall portions which are interconnected for folding movement between a substantially flat, thin, collapsed, over-the-road position overlying the automobile trunk compartment, and an extended, operational position wherein the camper capsule provides a habitable enclosure, the front, top, and rear wall portions being rectangular and, when viewed from the side, defining the trapezium, the side wall portions including a plurality of approximate right-angled triangles, the triangles being hingedly connected to each other and to the front, top, and rear wall portions with a releasable, diagonal connection between adjacent triangles extending from one corner of the trapezium to a diametrically opposite corner of the trapezium, the releasable connection, when released, permitting the triangles to fold inwardly and the front, top, and rear wall portions to be folded with respect to each other into a substantially flat collapsed position.

22. The trunk-mountable camper capsule of claim 21, wherein the releasable connection is in the form of a zipper.

23. The camper capsule of claim 21, wherein the front, top, rear, and side wall portions are formed of relatively rigid material.

24. The camper capsule of claim 21, wherein the side wall portions are formed of a flexible material.

25. A trunk-mountable camper capsule for autmobiles, comprising:
(a) structure defining an enclosure having a "primary" compartment portion adapted to extend rearwardly of the trunk compartment of an automobile, and a "secondary" compartment portion in communication with the "primary" compartment portion and adapted to overlie the trunk compartment;
(b) lower portions of the structure which overlie and extend along the trunk compartment of an automobile being formed from relatively rigid material and providing an upwardly-opening base forming lower regions of both of the "primary" and "secondary" compartment portions;
(c) mounting means for releasably mounting the structure portions about the trunk compartment of an automobile with the "primary" compartment portion extending rearwardly of, and with the "secondary" compartment portion overlying, the trunk compartment; and,
(d) upper portions of the structure including front, top, rear and side wall portions which are interconnected for folding movement between a substantially flat, thin, collapsed, over-the-road position overlying the automobile trunk compartment, and an extended, operational position wherein the camper capsule provides a habitable enclosure;
(e) said side wall portions each including at least a pair of panels and releasable connection means extending therebetween across the sidewall portion.

26. The trunk-mountable camper capsule of claim 25, wherein the releasable connection is in the form of a zipper.

27. The trunk-mountable camper capsule of claim 25, wherein the front, top, rear, and side wall portions are formed of relatively rigid material.

28. The trunk-mountable camper capsule of claim 25, wherein the side wall portions are formed of a flexible material.

29. A trunk-mountable camper capsule for automobiles, comprising:
(a) structure defining a relatively tall "primary" compartment adapted to be positioned rearwardly of the trunk compartment of an automobile, and defining a relatively shorter "secondary" compartment communicating with upper portions of the primary compartment and extending forwardly therefrom for overlying the trunk compartment of an automobile;
(b) the structure including first and second bottom walls defining the floors of the "primary" and "secondary" compartments, respectively, and including front, rear, top and side wall portions cooperating with the bottom walls to define an enclosure;
(c) lower portions of the walls which define the "primary" and "secondary" compartments being formed from rigid materials and cooperating to define a relatively rigid, upwardly-opening base;
(d) upper portions of the walls which define the "primary" and "secondary" compartments being movable between a substantially flat, thin, collapsed, over-the-road position overlying the upwardly opening base, and an extended, operational position wherein the upper wall portions cooperate with the lower wall portions to define a habital enclosure; and,
(e) mounting means for releasably mounting the camper capsule about the trunk compartment of an automobile with the "primary" compartment positioned rearwardly of the trunk compartment and with the "secondary" compartment overlying the trunk compartment;
(e) said side wall portions each including at least a pair of panels and releasable connection means extending therebetween across the sidewall portion.

30. The camper capsule of claim 29 wherein certain of the upper wall portions are formed from relatively rigid material and are hingedly mounted for movement between the collapsed and extended positions.

31. The camper capsule of claim 30, wherein selected of the certain upper wall portions are operable to form a rigid watertight cover for the base when the upper wall portions are in their collapsed over-the-road position.

32. The camper capsule of claim 31, wherein at least a part of the selected portions is formed of transparent or semi-transparent material.

33. The camper capsule of claim 29, wherein certain of the upper wall portions are formed from relatively flexible material, the certain wall portions being movable between the collapsed and extended positions.

34. The camper capsule of claim 33, wherein other of the upper wall portions are formed from relatively rigid material and are operable to form a rigid watertight cover for the base when the upper wall portions are in their collapsed over-the-road position.

35. The camper capsule of claim 34, wherein at least a part of the selected portions is formed of transparent or semi-transparent material.

36. The camper capsule of claim 29 wherein cot means is provided within the compartment-defining means including structure movable between a storage position located in a lower portion of the "primary" compartment and a sleeping position extending centrally through the "primary" compartment to provide a bed platform which extends contiguously with the bottom wall of the "secondary" compartment.

37. The camper capsule of claim 36 wherein lower wall portions of the structure cooperate to define a region located below the cot means when the cot means is in its sleeping position, the region being of sufficient size to sleep a third adult lying transversely therein.

38. The camper capsule of claim 29 additionally including cushion means supported atop the bottom wall of the "secondary" compartment.

39. The camper capsule of claim 29, wherein a door is provided for the rear wall, to selectively permit entrance to, or exit from, the interior of the capsule.

40. The camper capsule of claim 29 wherein the mounting means includes bumper mounting means for releasably attaching the capsule to the bumper of an automobile.

41. The camper capsule of claim 40 wherein the bumper mounting means is operable to establish a pivotal connection between the camper capsule and the bumper for permitting the camper capsule to be pivoted rearwardly out of the path of movement of the automobile's trunk lid.

42. The camper capsule of claim 29, wherein the mounting means additionally includes body mounting means engageable with automobile body portions near the trunk lid opening for releasably attaching the bottom wall of the "secondary" compartment thereto.

43. The camper capsule of claim 29, wherein at least a portion of the rear wall is pivotally mounted for opening movement when the upper wall portions are in their extended, operational position to facilitate loading and unloading of the camper capsule.

* * * * *